(12) United States Patent
Chiba et al.

(10) Patent No.: US 10,397,534 B2
(45) Date of Patent: Aug. 27, 2019

(54) PROJECTION DISPLAY AND IMAGE CORRECTION METHOD

(71) Applicant: Sony Corporation, Tokyo (JP)

(72) Inventors: Atsuhiro Chiba, Tokyo (JP); Masahiro Takada, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/765,050

(22) PCT Filed: Sep. 6, 2016

(86) PCT No.: PCT/JP2016/076095
§ 371 (c)(1),
(2) Date: Mar. 30, 2018

(87) PCT Pub. No.: WO2017/061213
PCT Pub. Date: Apr. 13, 2017

(65) Prior Publication Data
US 2018/0295333 A1  Oct. 11, 2018

(30) Foreign Application Priority Data
Oct. 6, 2015 (JP) ................................. 2015-198762

(51) Int. Cl.
*H04N 9/31* (2006.01)
*G03B 21/26* (2006.01)
(Continued)

(52) U.S. Cl.
CPC ........... *H04N 9/3185* (2013.01); *G03B 21/00* (2013.01); *G03B 21/26* (2013.01); *G06T 7/0002* (2013.01);
(Continued)

(58) Field of Classification Search
CPC ...... H04N 5/2256; H04N 5/74; H04N 9/3185; H04N 9/3191; G03B 21/00; G03B 21/14;
(Continued)

(56) References Cited

U.S. PATENT DOCUMENTS 6,753,907 B1 * 6/2004 Sukthankar .......... H04N 5/7408
                                                      348/190
8,649,090 B2 * 2/2014 Hosoi ..................... G03B 21/62
                                                      359/453
(Continued)

FOREIGN PATENT DOCUMENTS

JP       2005-006272 A      1/2005
JP       2009-200683 A      9/2009
(Continued)

OTHER PUBLICATIONS

Written Opinion and English translation thereof dated Nov. 29, 2016 in connection with International Application No. PCT/JP2016/076095.

(Continued)

*Primary Examiner* — Lin Ye
*Assistant Examiner* — Chriss S Yoder, III
(74) *Attorney, Agent, or Firm* — Wolf, Greenfield & Sacks, P.C.

(57) ABSTRACT

A projection display includes an image display device that displays an image, a projection unit that projects the image displayed by the image display device to a projection surface, a light irradiator that irradiates the projection surface with linear light at an incident angle shallower than an incident angle of projection light, in which the linear light extends along a first direction within the projection surface, an imaging unit that has an optical axis different from an optical axis of the light irradiator, and performs capturing of the projection surface, and a signal processor that performs (Continued)

signal processing on an imaging signal outputted from the imaging unit. The imaging unit performs capturing of the linear light with which the projection surface is irradiated, and the signal processor corrects, on a basis of a captured image of the linear light, a distortion of the projected image.

20 Claims, 13 Drawing Sheets

(51) Int. Cl.
*G03B 21/00* (2006.01)
*H04N 5/74* (2006.01)
*G06T 7/00* (2017.01)
*H04N 5/225* (2006.01)

(52) U.S. Cl.
CPC ............. *H04N 5/2256* (2013.01); *H04N 5/74* (2013.01); *H04N 9/3191* (2013.01); *G06T 2207/30168* (2013.01); *G09G 2320/0693* (2013.01)

(58) Field of Classification Search
CPC .. G03B 21/142; G03B 21/145; G03B 21/147; G03B 21/2046; G03B 21/206; G03B 21/208; G03B 21/26; G06T 7/0002; G06T 2207/30168; G09G 2320/0693
See application file for complete search history.

(56) References Cited

U.S. PATENT DOCUMENTS

| | | | |
|---|---|---|---|
| 2005/0062939 A1* | 3/2005 | Tamura | H04N 5/7416 353/69 |
| 2009/0207185 A1* | 8/2009 | Furui | H04N 9/3185 345/619 |
| 2010/0014778 A1* | 1/2010 | Imai | H04N 9/3185 382/275 |
| 2012/0182416 A1* | 7/2012 | Kawaguchi | H04N 9/3185 348/128 |

FOREIGN PATENT DOCUMENTS

| | | |
|---|---|---|
| JP | 2010-072422 A | 4/2010 |
| JP | 2013-172444 A | 9/2013 |
| JP | 2015-118252 A | 6/2015 |

OTHER PUBLICATIONS

International Preliminary Report on Patentability and English translation thereof dated Apr. 19, 2018 in connection with International Application No. PCT/JP2016/076095.

International Search Report and English translation thereof dated Nov. 29, 2016 in connection with International Application No. PCT/JP2016/076095.

* cited by examiner

[ FIG. 1 ]
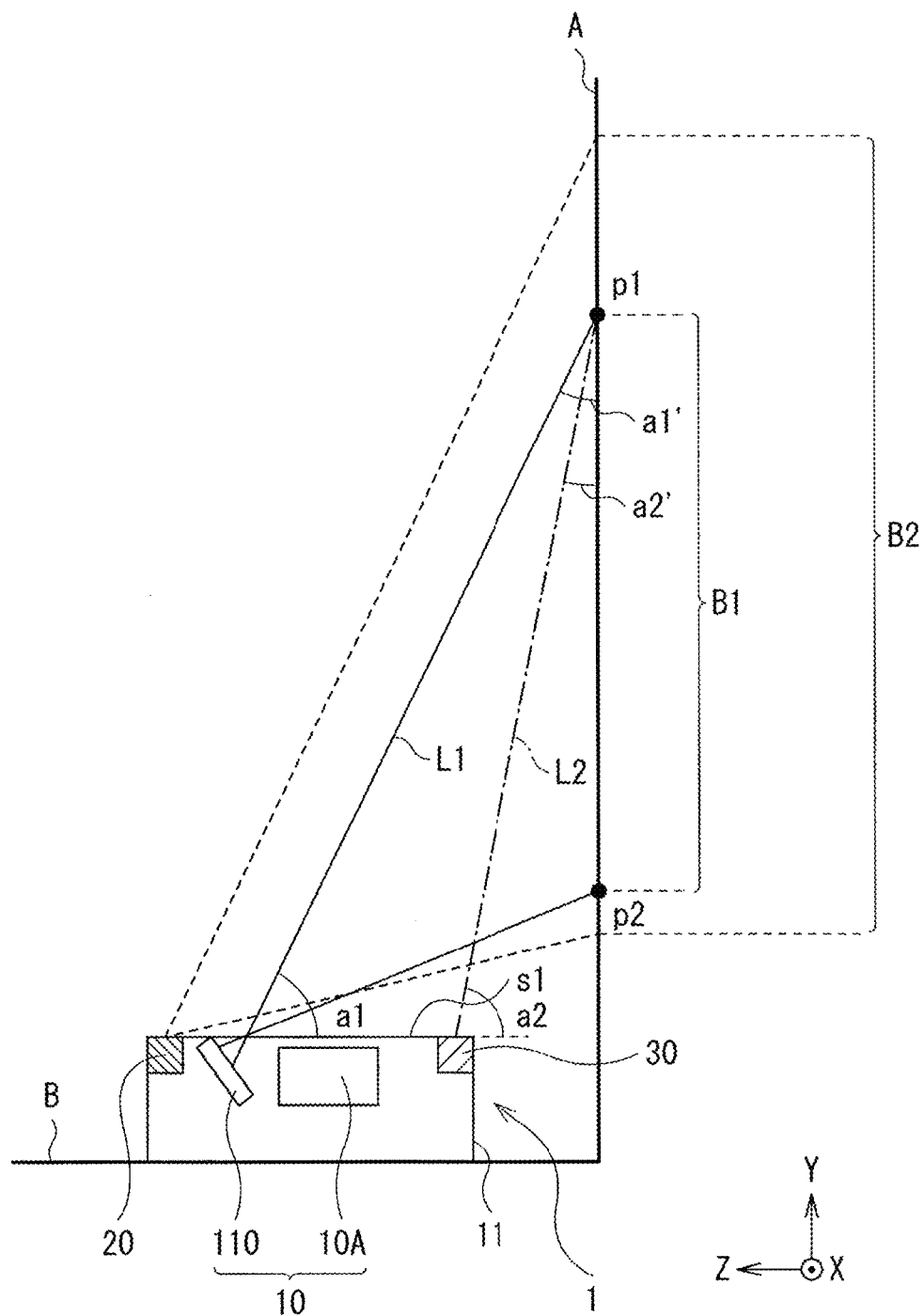

[ FIG. 2 ]
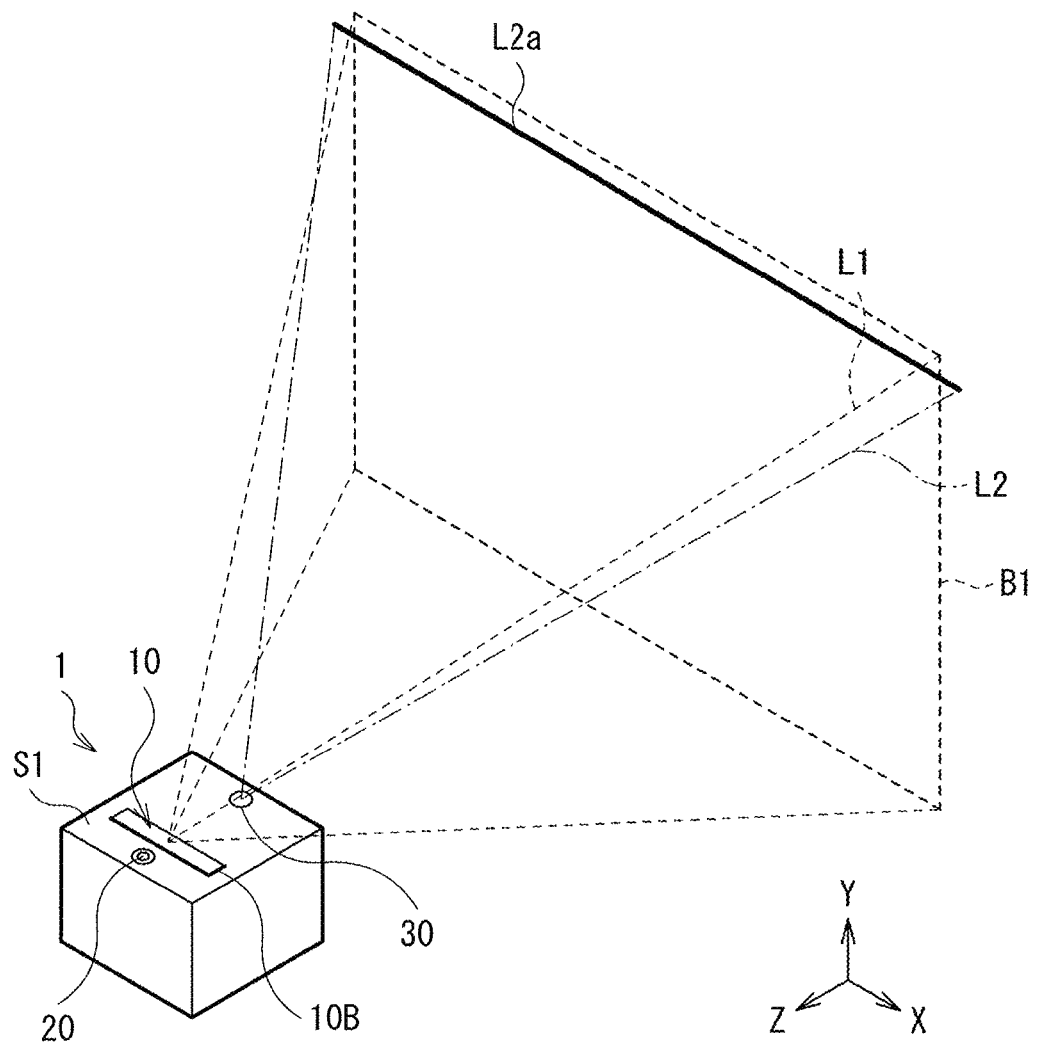

[ FIG. 3 ]
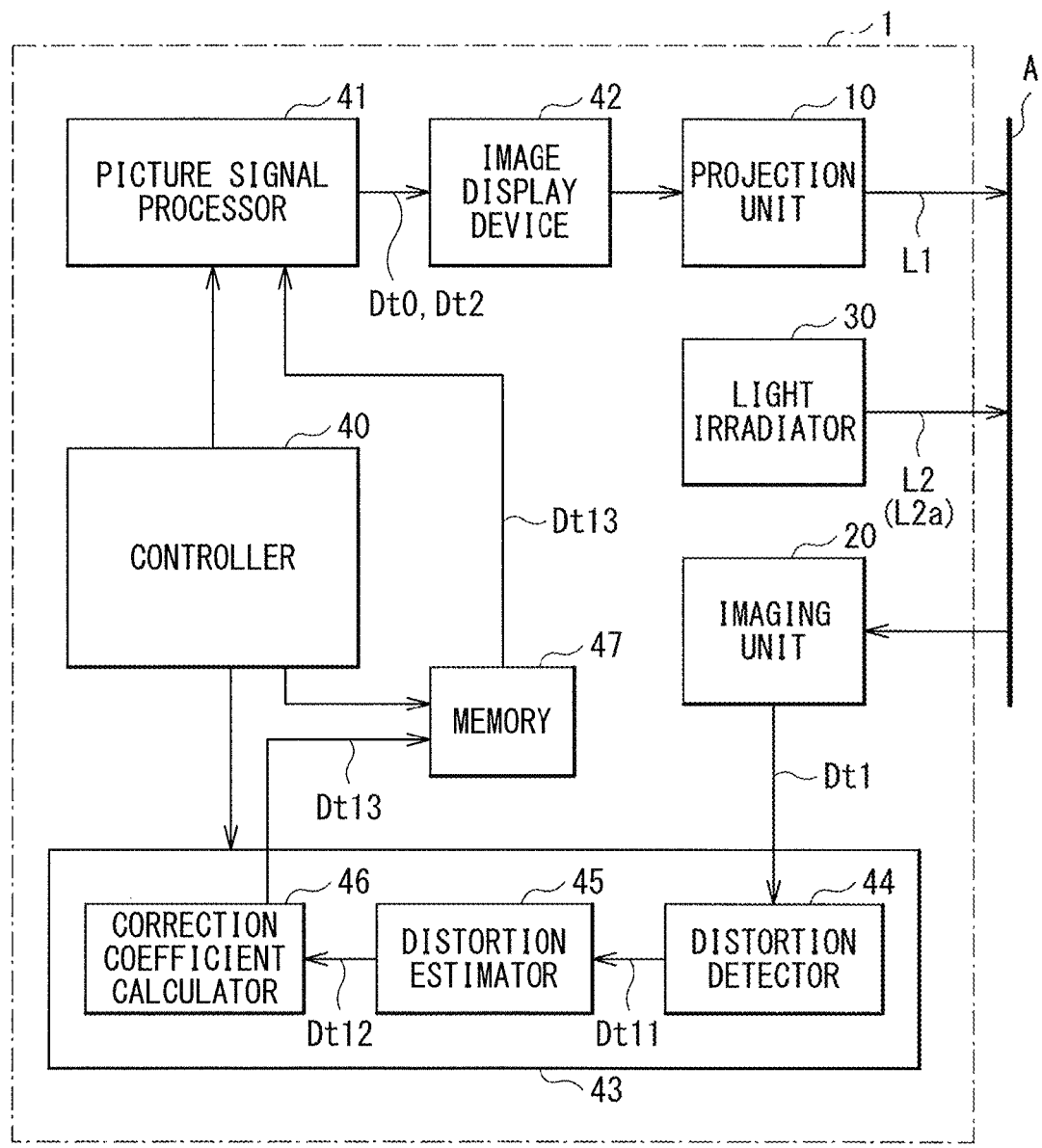

[FIG. 4]
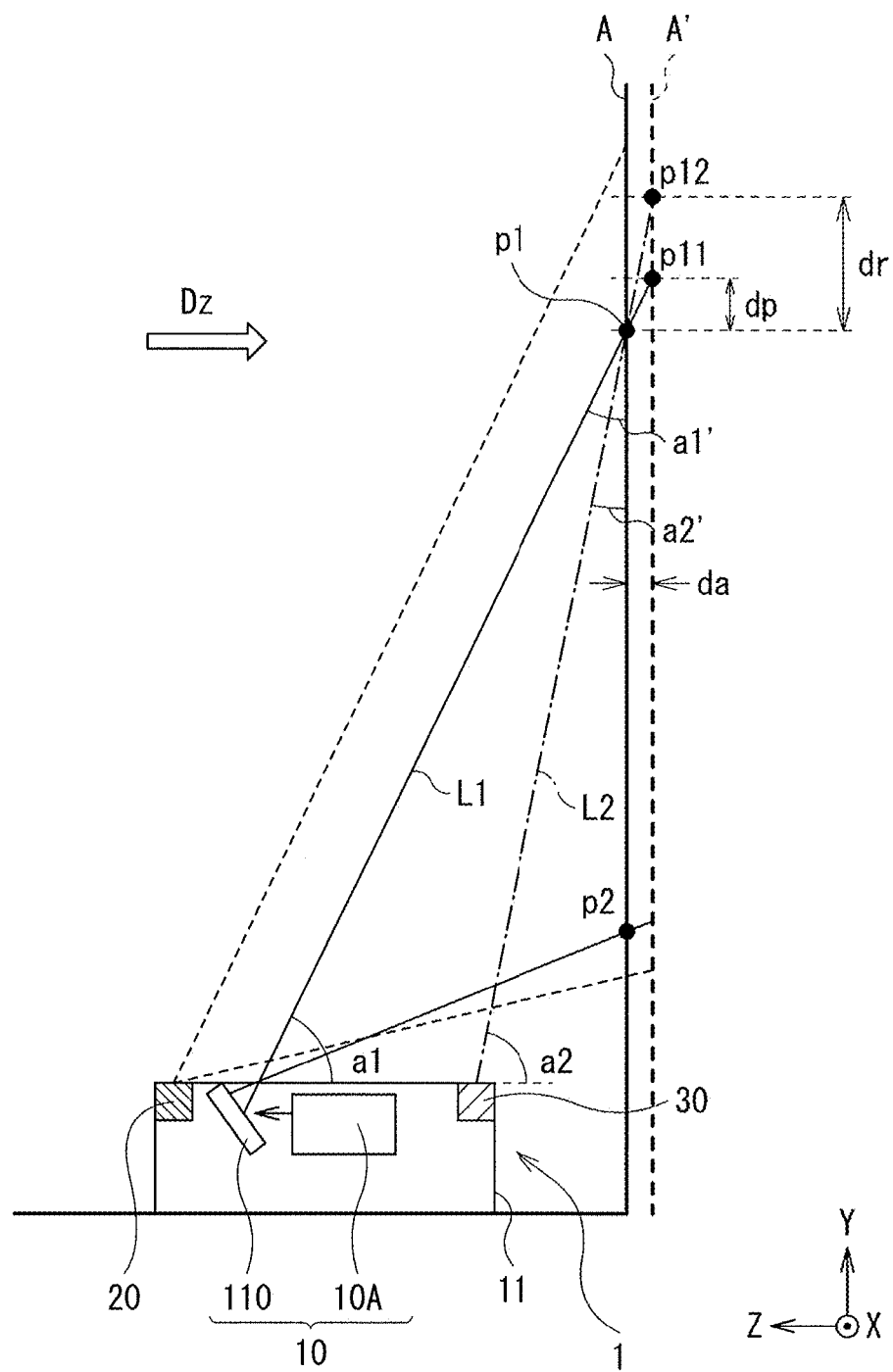

[ FIG. 5A ]
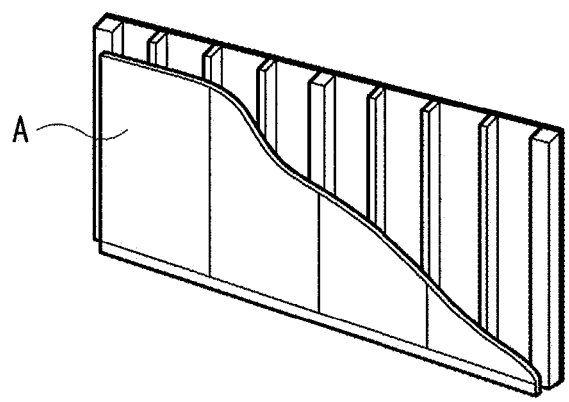
[ FIG. 5B ]
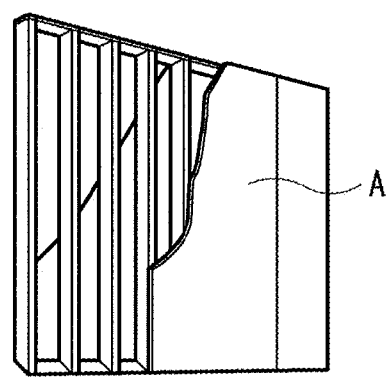

[ FIG. 6 ]
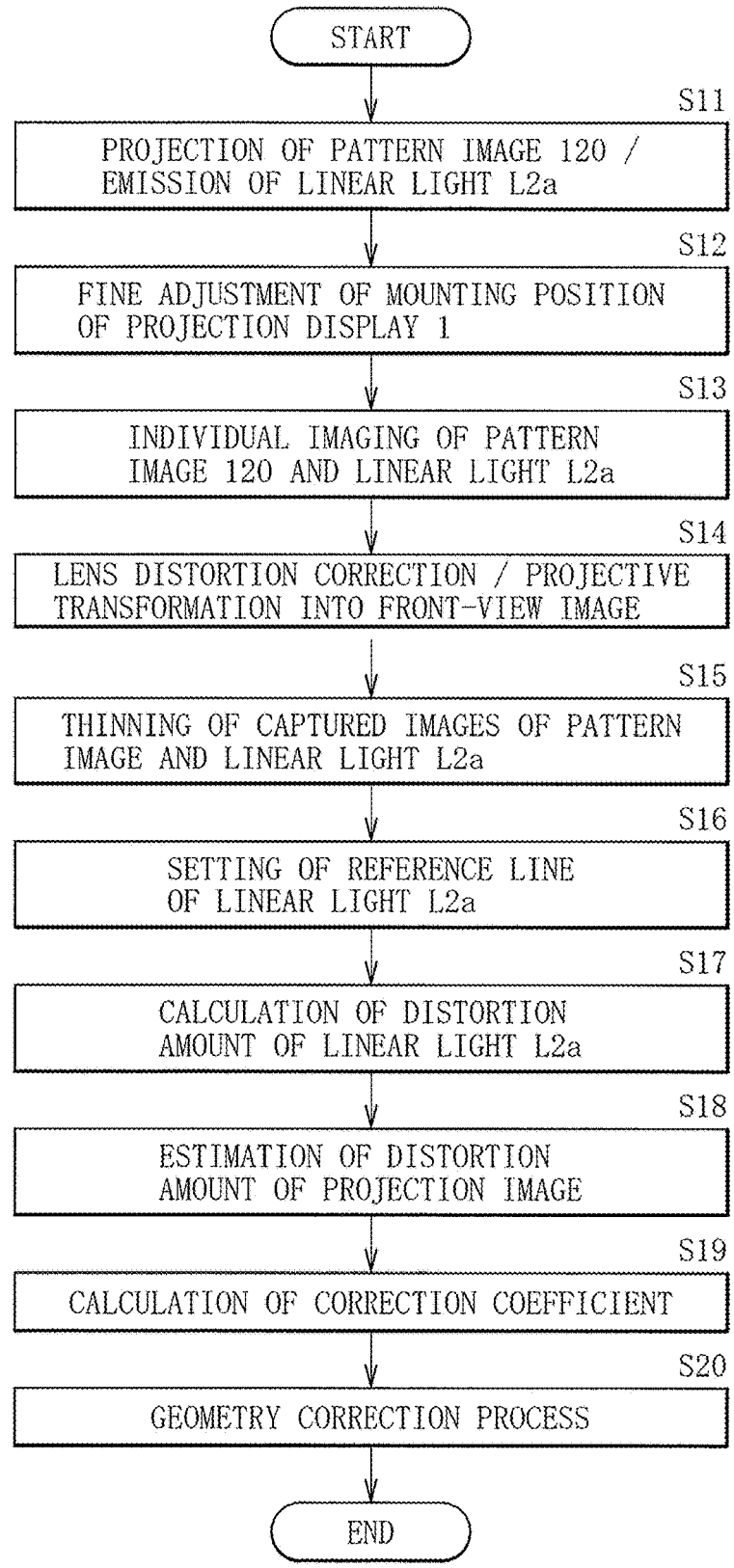

[ FIG. 7 ]
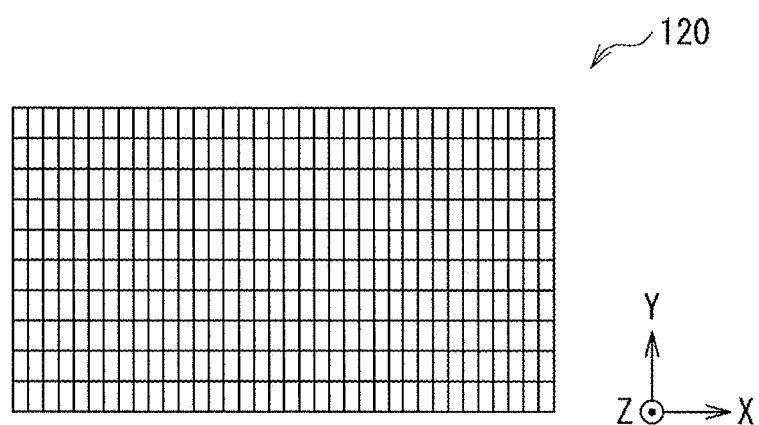
[ FIG. 8 ]
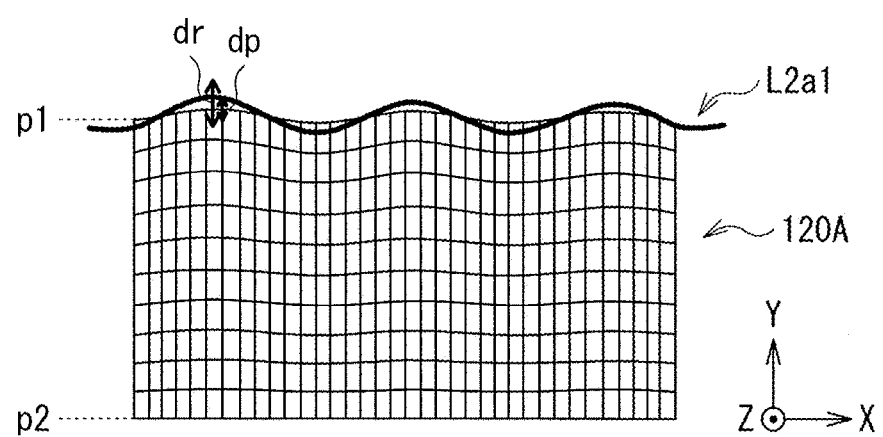

[ FIG. 9 ]
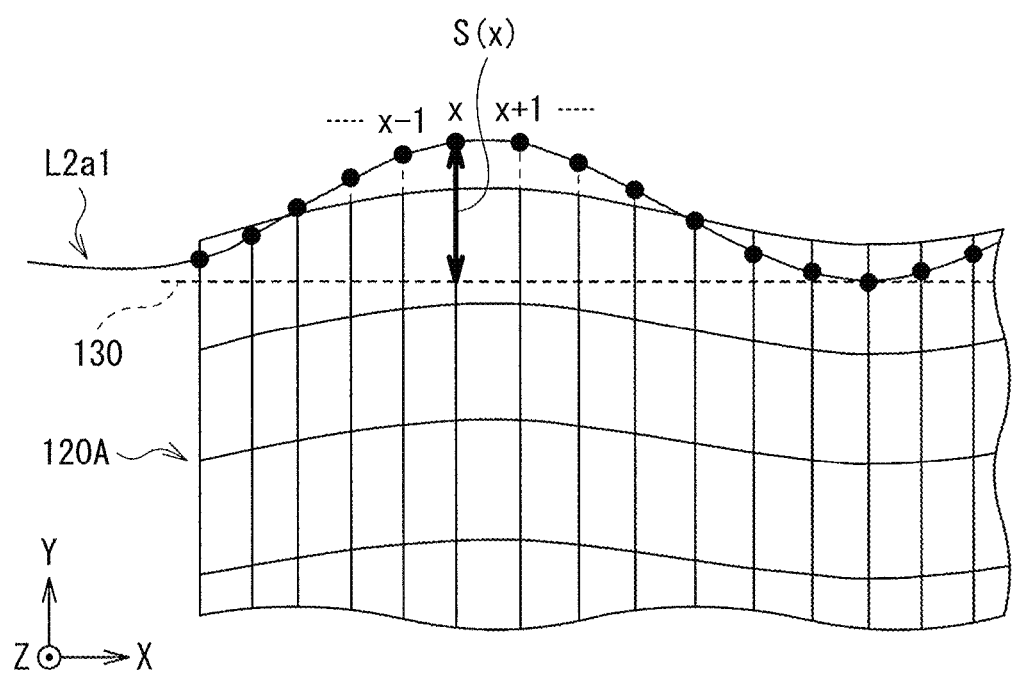

[ FIG. 10 ]
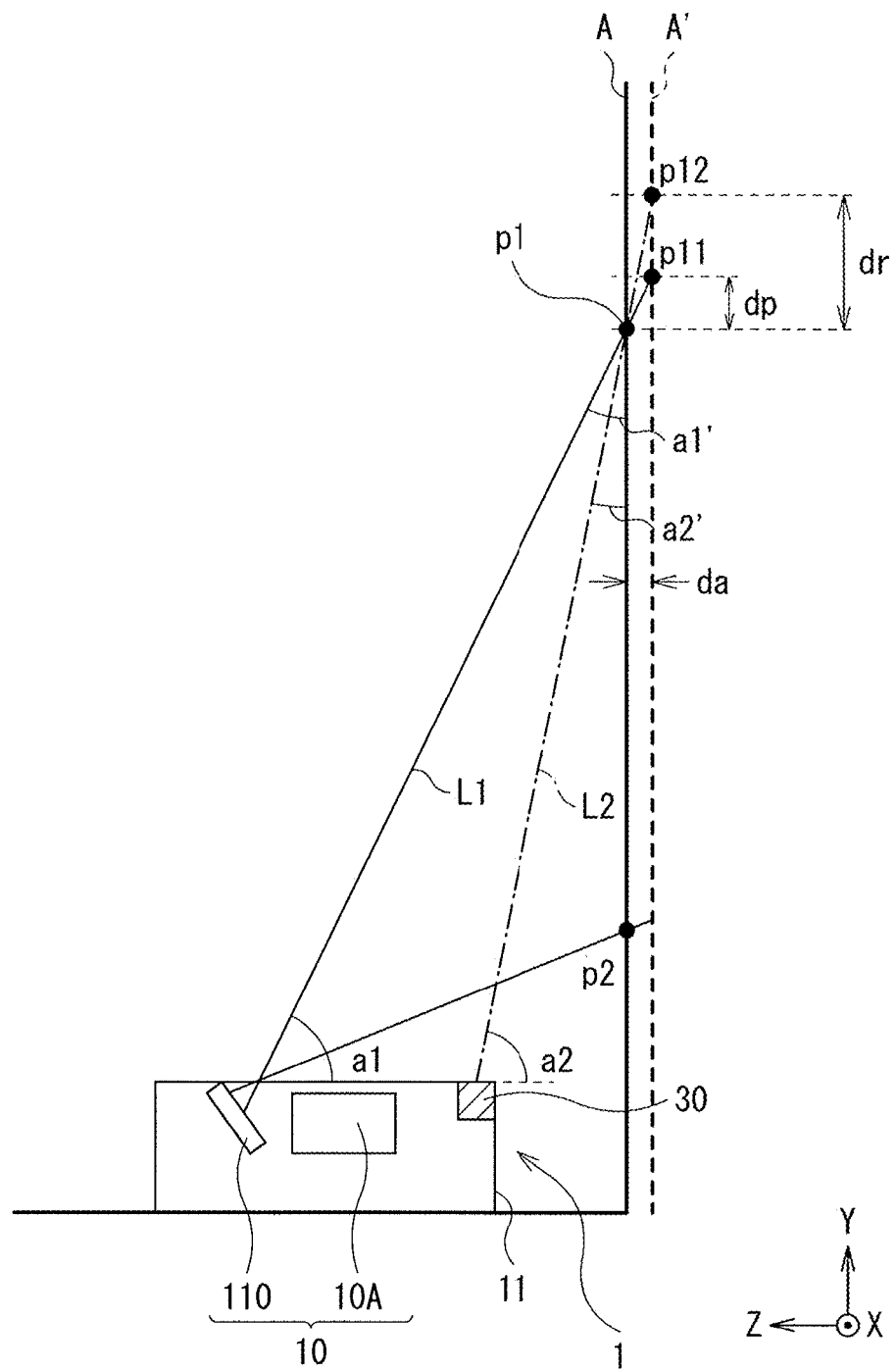

[ FIG. 11A ]
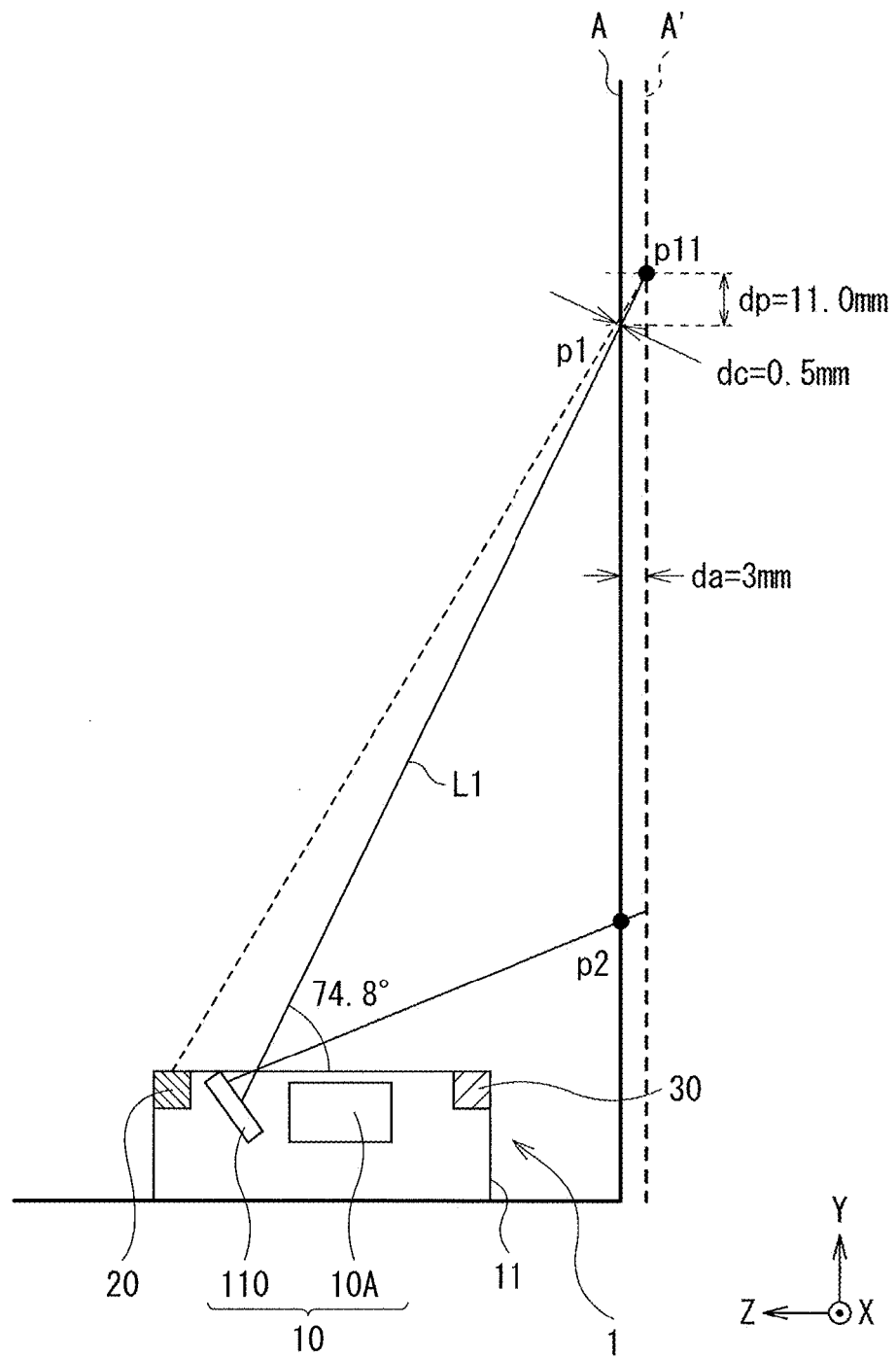

[ FIG. 11B ]
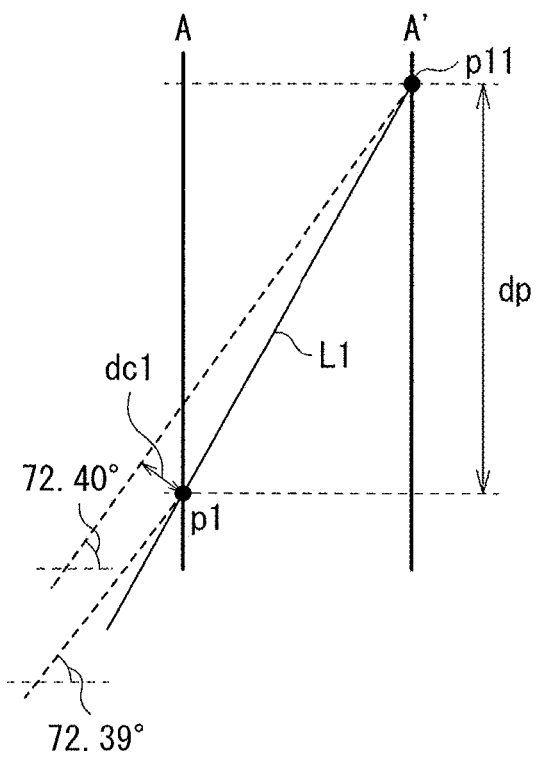

[ FIG. 12 ]
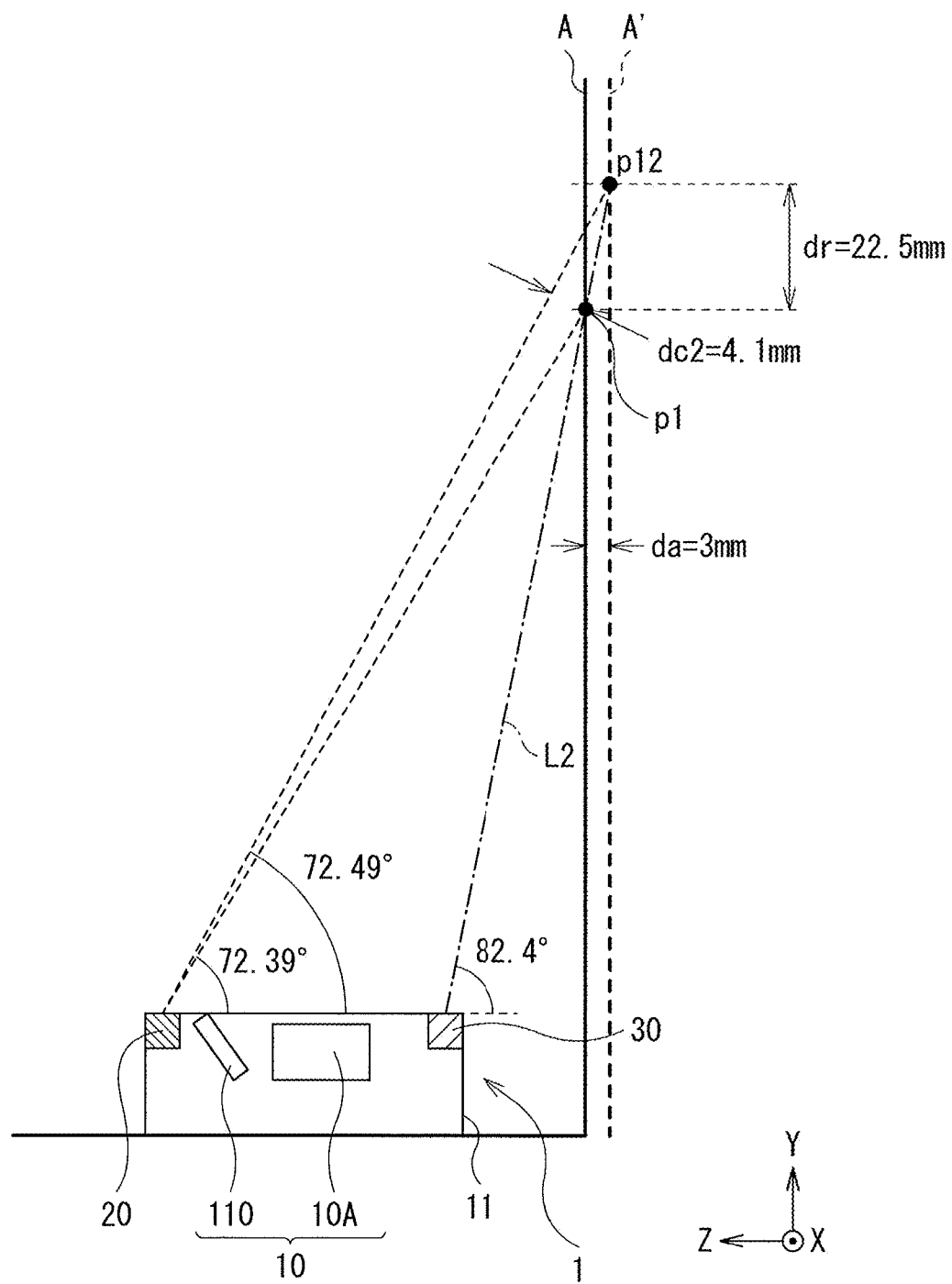

[ FIG. 13 ]
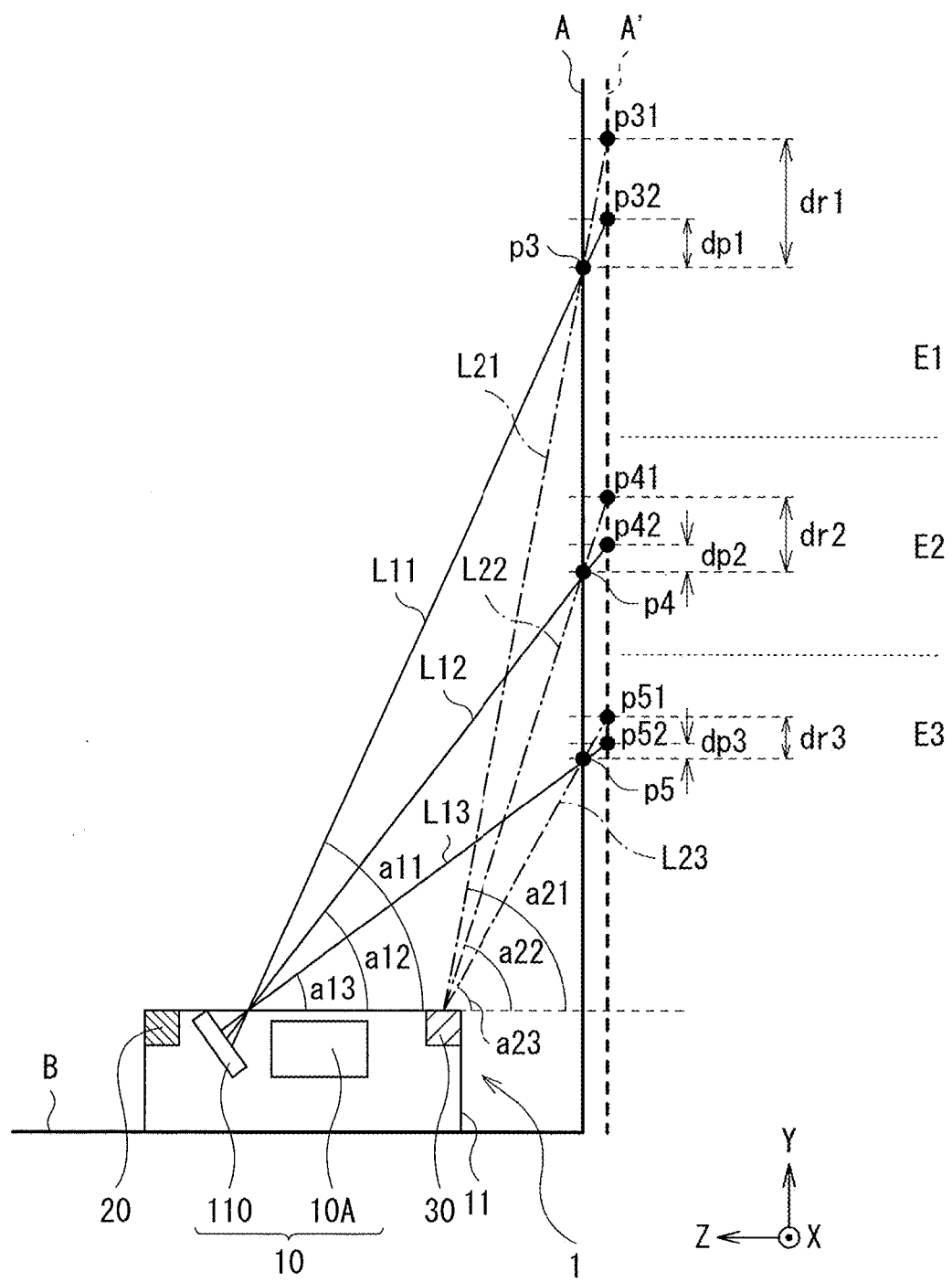

PROJECTION DISPLAY AND IMAGE CORRECTION METHOD

CROSS REFERENCE TO RELATED APPLICATIONS

This is a U.S. National Stage Application under 35 U.S.C. § 371, based on International Application No. PCT/JP2016/076095, filed Sep. 6, 2016, which claims priority to Japanese Patent Application JP 2015-198762, filed Oct. 6, 2015, each of which is hereby incorporated by reference in its entirety.

TECHNICAL FIELD

The disclosure relates to a projection display with an imaging function, and an image correction method.

BACKGROUND ART

A projection display that is called a short focus (ultra-short focus) projector makes it possible to project and display a picture of a wide visual field and high definition from a very short projection distance. Such a projection display prevents the shadow or the like of a user approaching a projection surface from being displayed on the projection surface, and also makes it possible to display a picture with realistic sensation. For example, the projection display makes it possible to project an image of a wide visual field on the wall surface of a lounge, etc. The projection display has attracted attention as new picture displaying technology available in a daily space.

On the other hand, such a projection display projects pictures at a shallow angle to the projection surface, and thus causes the distortion (deformation) of a projection image due to slight displacements (for example, unevenness, asperities, steps) on the projection surface. For example, a completely flat wall surface is impractical for a common residence for structural reasons. There is a demand for functions which make it possible to correct the distortion of projection image and make the distortion less conspicuous when an uneven projection surface serves as the projection surface, for example.

To meet the demand, a scheme is proposed which involves projecting a pattern image for calibration of a distortion, capturing an image of the projected pattern image with a camera prepared separately, calculating a distortion on the basis of the captured image to correct the projection image (for example, PTL 1). Another technology that corrects a projection image involves capturing an image of a pattern image with a camera mounted on the body of a projection display, and performing shape correction (keystone correction) on the projected screen on the basis of the captured image (PTL 2), etc.

CITATION LIST

Patent Literature

PTL 1: Japanese Unexamined Patent Application Publication No. 2013-172444
PTL 2: Japanese Unexamined Patent Application Publication No. 2010-72422

SUMMARY OF THE INVENTION

Unfortunately, in the scheme described in PTL 1 described above, it is necessary for a user to place a camera and capture images with the camera, and thus lacks convenience. Furthermore, the configuration of the device described in PTL 2 has difficulty in detecting a distortion caused by the unevenness of the projection surface. There is a demand for implementation of a scheme which makes it possible to correct the distortion of a projection image to improve the quality of a displayed image while maintaining convenience.

It is desirable to provide a projection display and an image correction method which make it possible to improve the quality of a projection image while maintaining convenience.

A projection display according to an embodiment of the disclosure includes: an image display device that displays an image; a projection unit that projects the image displayed by the image display device to a projection surface; a light irradiator that irradiates the projection surface with linear light at an incident angle shallower than an incident angle of projection light, in which the linear light extends along a first direction within the projection surface; an imaging unit that has an optical axis different from an optical axis of the light irradiator, and performs capturing of the projection surface; and a signal processor that performs signal processing on an imaging signal outputted from the imaging unit. The imaging unit performs capturing of the linear light with which the projection surface is irradiated, and the signal processor corrects, on a basis of a captured image of the linear light, a distortion of the projected image.

In the projection display according to the embodiment of the disclosure, the light irradiator irradiates the projection surface with the predetermined linear light at the incident angle shallower than that of the projection light, and the imaging unit having the optical axis different from that of the light irradiator performs capturing of the linear light. The signal processor corrects the distortion of the projected image, on the basis of the captured image of the linear light. This makes it possible to correct the distortion of the image caused by the unevenness of the projection surface, without the necessity for a user to place a camera and capture images with the camera.

An image correction method according to an embodiment of the disclosure includes, upon correcting an image projected to a projection surface: irradiating the projection surface with linear light at an incident angle shallower than an incident angle of projection light, in which the linear light extends along a first direction within the projection surface; performing capturing, from an optical path different from an optical path of the linear light, the linear light with which the projection surface is irradiated; and correcting, on a basis of a captured image of the linear light, a distortion of the projected image.

In the image correction method according to the embodiment of the disclosure, the projection surface is irradiated with the predetermined linear light at the incident angle shallower than that of the projection light, and capturing is performed of the linear light from the optical path different from that of the linear light. The distortion of the projected image is corrected on the basis of the captured image of the linear light. This makes it possible to correct the distortion of the image caused by the unevenness of the projection surface, without the necessity for a user to place a camera and capture images with the camera.

According to the projection display of the embodiment of the disclosure, the light irradiator irradiates the projection surface with the predetermined linear light at the incident angle shallower than that of the projection light, the capturing unit having the optical axis different from that of the light irradiator performs capturing of the linear light, and the signal processor corrects the distortion of the projected image, on the basis of the captured image of the linear light. This makes it possible to improve the quality of the projection image while maintaining convenience.

According to the image correction method of the embodiment of the disclosure, the projection surface is irradiated with the predetermined linear light at the incident angle shallower than that of the projection light, capturing is performed of the linear light from the optical path different from that of the linear light, and the distortion of the projected image is corrected on the basis of the captured image of the linear light. This makes it possible to improve the quality of the projection image while maintaining convenience.

It is to be noted that the above description refers to examples of the disclosure. Effects of the disclosure are not limited to the effects described above, and may be any other effects or may further include any other effects.

BRIEF DESCRIPTION OF DRAWING

FIG. 1 is a side view of a schematic configuration of a projection display according to an embodiment of the disclosure and illustrates use state of the projection display.

FIG. 2 is a perspective view of the schematic configuration of the projection display in FIG. 1.

FIG. 3 is a functional block diagram of the projection display in FIG. 1.

FIG. 4 is a schematic diagram that illustrates the distortion of a projection image caused by the unevenness of a projection surface.

FIG. 5A is a perspective diagram that illustrates the structure of a wall surface.

FIG. 5B is a perspective diagram that illustrates the structure of a wall surface.

FIG. 6 is a flow chart of image correction operation.

FIG. 7 is a schematic view of an example pattern image.

FIG. 8 is a schematic diagram that illustrates captured images of the pattern image and linear light.

FIG. 9 is a schematic diagram that illustrates setting operation of a reference line and calculation operation of a differential value.

FIG. 10 is a diagram that illustrates parameters for operational processing upon estimation of the distortion of the projection image.

FIG. 11A is a diagram that represents numerical examples of parameters upon image capturing of projection light.

FIG. 11B is an enlarged view of a region around an upper end position illustrated in FIG. 11A.

FIG. 12 is a diagram that represents numerical examples of parameters upon image capturing of the linear light.

FIG. 13 is a side view of a configuration of a projection display according to a modification and illustrates use state of the projection display.

MODES FOR CARRYING OUT THE INVENTION

In the following, embodiments of the disclosure are described in detail with reference to the drawings. It is to be noted that description is made in the following order.
1. Embodiment (An exemplary projection display that corrects the distortion of a projection image on the basis of a captured image of linear light incident at a shallower incident angle than that of projection light)
2. Modification (An exemplary case where linear light is emitted to a plurality of positions and correction of the image distortion is performed for each of regions corresponding to the respective positions at which the linear light is emitted)

Embodiment

[Configuration]

FIGS. 1 and 2 illustrate a configuration and use state of a projection display (projection display 1) according to an embodiment of the disclosure. FIG. 3 illustrates a functional configuration of the projection display 1. It is to be noted that, in FIGS. 1 and 2, the XY-plane corresponds to a projection surface A, the XZ-plane corresponds to a mounting surface B, the X-direction corresponds to a horizontal direction, for example, and the Y-direction corresponds to a vertical direction, for example.

The projection display 1 is a projector of a type (a so-called short focus or ultra-short focus projector) that projects a picture to the projection surface A, which is a wall surface of a room, for example, from a short projection distance. The projection display 1 is mounted in the vicinity of the projection surface A when used. In this embodiment, the projection display 1 is mounted on the mounting surface B, such as the surface of a floor or platform, in the vicinity of the projection surface A when used. It is to be noted that the projection surface A is not limited to a wall surface, and may be any uneven surface, in particular, a surface uneven in a predetermined direction.

As illustrated in FIG. 3, the projection display 1 includes, for example, a projection unit 10, an imaging unit 20, a light irradiator 30, a controller 40, a picture signal processor 41, an image display device 42, an imaging signal processor 43, and a memory 47. The projection unit 10, the imaging unit 20, the light irradiator 30, the controller 40, the picture signal processor 41, the image display device 42, the imaging signal processor 43, and the memory 47 are covered with an outer case (housing 11) (accommodated in the housing 11), for example. It is to be noted that the imaging signal processor 43 and the picture signal processor 41 according to the embodiment correspond to specific examples of a "signal processor" of the disclosure. Alternatively, some of these components may be so mounted as to be exposed from the housing 11 or may be mounted outside the housing 11. In the following, the configurations of the components are described in detail.

The projection unit 10 includes, for example, a projection optical system 10A and a reflection mirror 110, and projects (with enlargement, for example) an image displayed on the image display device 42 to the projection surface A. The projection optical system 10A includes, for example, a projection lens unit. The reflection mirror 110 converts the optical path of light emitted from the projection optical system 10A to introduce the light to the projection surface A. The light reflected at the reflection mirror 110 is projection light L1. It is to be noted that the reflection mirror 110 may not be provided depending on the layout of the projection optical system 10A. The projection unit 10 may also include a light source, an illumination optical system, a color separation optical system, and a color synthesis optical system that are not illustrated, besides the projection optical system 10A and the reflection mirror 110. For example, in a case where the image display device 42 is a liquid crystal display device or the like, the projection unit 10 includes a light source, and also includes, for example, the illumination optical system, the color separation optical system, the image display device 42, and the color synthesis optical system, in this order, along the optical path between the light source and the projection optical system 10A. In a case where the image display device 42 is a self-light-emitting device, such as an organic electroluminescent device, the projection unit 10 does not necessarily include, in particular, the light source and the illumination optical system.

The projection lens unit includes, for example, a short focus lens having a small throw ratio (Throw Ratio). The throw ratio is defined by L/H, where L represents the distance from the projection lens unit to the projection surface A (projection distance), and H represents the width (width along the X-direction) of a range that allows for the projection of a picture (projection range B1, projection screen). In the projection range B1, a position at which an elevation angle a1 of the projection light L1 with respect to the projection surface A is maximum is defined as an upper end position p1, and a position at which the elevation angle a1 is minimum is defined as a lower end position p2. Moreover, a correction pattern image for the correction is projected to the projection range B1 upon the correction processing described later.

The imaging unit 20 is a camera that includes, for example, an imaging device and various optical devices and captures an image of the projection surface A. The imaging device is, for example, a solid-state imaging device, such as a complementary metal-oxide semiconductor (CMOS) or a charge coupled device (CCD). Examples of the imaging unit 20 include a camera with a wide-angle lens. Alternatively, the imaging unit 20 may include a plurality of cameras and perform stitching on images captured with the cameras to generate a wide-angle image.

The imaging unit 20 is mounted on a side of a surface S1 of the housing 11, for example, together with an exit opening 10B of the projection unit 10 and the light irradiator 30. In the embodiment, the imaging unit 20 is disposed in the vicinity of the exit opening 10B, for example, and is provided at a position more adjacent to a viewer (a position on the positive side of the Z-direction) than the exit opening 10B. Accordingly, the imaging unit 20 makes it possible to perform imaging in a range (an imaging range B2) which is approximately equal to the projection range B1. The imaging range B2 is set to have a width wider than the projection range B1 in the vertical direction (Y-direction) and the lateral direction (X-direction). The imaging unit 20 has an optical axis different from that of the light irradiator 30 (the imaging unit 20 is disposed such that the optical axis of the camera of the imaging unit 20 and the optical axis of the light irradiator 30 are not aligned with respect to each other). This allows the imaging unit 20 to capture an image of the projection surface A from the optical path different from the optical path of laser light L2 (the irradiation optical path of linear light L2a) outputted from the light irradiator 30. The image captured with the imaging unit 20 (imaging signal Dt1) is outputted to the imaging signal processor 43.

The light irradiator 30 is a light source used for correction (calibration) of distortions of a projection image. The light irradiator 30 includes, for example, a laser light source that emits laser light L2 to irradiate the projection surface A with linear light L2a (linearly) extending in a predetermined direction (first direction) on the projection surface A. The linear light L2a is a line laser beam extending along a horizontal direction (first direction, X-direction) perpendicular to the vertical direction (second direction, Y-direction), for example. The light irradiator 30 desirably includes a laser light source that outputs highly-directional laser light L2. Alternatively, the light irradiator 30 may be another light source, such as an LED light source, as long as it is possible to irradiate the projection surface A with linear light. Moreover, the linear light L2a may have a wavelength within a visible range or an invisible range like near infrared (NIR) light, for example.

Besides the light irradiator 30, the projection display 1 desirably has a function (a motion sensor, for example) which detects that an object, such as a user, approaches (comes close to) the light irradiator 30, and stops emitting the linear light L2a upon the detection of the object. One reason is that it is possible to prevent an influence caused by the highly-directional linear light L2a on the eyes of the user.

The elevation angle a2 of the linear light L2a (emission angle of the laser light L2) may be fixed or variable. In other words, the linear light L2a may be emitted to a fixed or variable position of the projection surface A. In a case where the projection display 1 is disposed right in front of the projection surface A (disposed such that the projection range B1 has a rectangular shape), the elevation angle a2 is adjusted such that the linear light L2a is emitted to any position overlapping the projection range B1. Alternatively, the linear light L2a may be emitted to a position outside the projection range B1, for example, a position above the upper end position p1, as long as the position is within the imaging range B2.

It is to be noted that the elevation angle a2 is desirably set such that the linear light L2a is emitted to a position approximately the same as the upper end position p1 of the projection range B1, as described in the embodiment. Even in a case where the projection surface A is regularly (constantly) uneven in the Y-direction, the amount of the distortion caused by the unevenness of the projection surface A varies depending on a position within the projection range B1 in the Y-direction. In detail, the distortion amount is maximum at the upper end position p1 where the elevation angle a1 of the projection light L1 is maximum, and is minimum at the lower end position p2 where the elevation angle a1 of the projection light L1 is minimum, within the projection range B1. Accordingly, emitting the linear light L2a to the upper end position p1 and detecting the distortion (described later) on the basis of a captured image of the linear light L2a make it possible to enhance the detection sensitivity to the distortion amount.

The light irradiator 30 is disposed at a position more adjacent to the projection surface A than the exit opening 10B of the projection unit 10 on the surface S1 of the housing 11. In other words, the light irradiator 30 irradiates the projection surface A with the linear light L2a (or laser light L2) at an incident angle a2', which is shallower than the incident angle a1' of the projection light L1 (a1'>a2'). Although described in detail later, this configuration allows the linear light L2a to be distorted more easily than the projection light L1 because of the unevenness of the projection surface A. Moreover, the optical axis of the light irradiator 30 is so provided as not to be coincident with that of the camera of the imaging unit 20 (the light irradiator 30 has an optical axis different from that of the imaging unit 20). This configuration allows the camera to capture an image of the linear light L2a on the projection surface A from the optical path different from that of the linear light L2a, causing the distortion of the linear light L2a in the captured image of the linear light L2a. It is possible to estimate and correct the distortion of the projection image on the basis of the distortion of the captured image of the linear light L2a.

The controller 40 includes, for example, a CPU (Central Processing Unit: CPU). The controller 40 controls the operation of each component in the projection display 1. It is to be noted that the projection unit 10, the imaging unit 20, the light irradiator 30, and the image display device 42, for example, are each driven by a driver (not illustrated) at a predetermined timing on the basis of the control of the controller 40.

The picture signal processor 41 generates picture signals (Dt0) to be displayed on the image display device 42, on the basis of picture signals (image signals) inputted from the outside, for example. For example, the picture signals Dt0 corresponding to respective colors including R, G, and B are generated on the basis of the signals inputted from the outside. Moreover, the picture signal processor 41 includes, for example, a field programmable gate array (FPGA) or a graphics processing unit (GPU), and corrects the picture signals Dt0 using a correction coefficient outputted from the imaging signal processor 43 to be described later. The picture signals Dt0 generated by the picture signal processor 41 or the corrected picture signals (Dt2) are fed to the image display device 42 by, for example, an unillustrated timing controller or an unillustrated driver (driver circuit). The picture signal processor 41 corresponds to a specific example of a "correction unit" in the disclosure.

The image display device 42 is, for example, a reflective liquid crystal device, such as a liquid crystal on silicon (LCOS), a transmissive liquid crystal device, or a digital micromirror device (DMD). The image display device 42 modulates light from the illumination optical system (not illustrated) on the basis of the picture signals inputted from the picture signal processor 41. The light modulated at the image display device 42 is outputted to the projection surface A through the projection unit 10. It is to be noted that the image display device 42 may be a self-light-emitting device, such as an organic electroluminescent device. In this case, an illumination optical system is not necessary.

The imaging signal processor 43 includes, for example, a CPU or GPU, and performs various signal processing on the captured image (imaging signal Dt1) inputted from the imaging unit 20. The imaging signal processor 43 includes, for example, a distortion detector 44, a distortion estimator 45, and a correction coefficient calculator 46. It is to be noted that the distortion detector 44, the distortion estimator 45, and the correction coefficient calculator 46 respectively correspond to a specific example of a "detector", an "estimator", and a "correction coefficient calculator" in the disclosure.

The distortion detector 44 calculates the amount of distortion (first distortion amount or distortion amount dr described later) of the linear light L2a on the basis of the captured image (imaging signal Dt1) inputted from the imaging unit 20 through predetermined operational processing. The amount of distortion dr is caused by the unevenness (asperities) of the projection surface A, and is the amount of deformation of the linear light L2a in the vertical direction (Y-direction) orthogonal to the horizontal direction (X-direction) in this embodiment.

The distortion estimator 45 calculates the amount of distortion (second distortion amount, distortion amount dp described later) of the projection image on the basis of the distortion amount dr of the linear light L2a through the predetermined operational processing. The amount of the distortion dp is caused by the unevenness (asperities) of the projection surface A, and is the amount of deformation of the projection image in the vertical direction (Y-direction), for example.

The correction coefficient calculator 46 calculates, on the basis of the distortion amount dp calculated at the distortion estimator 45, a correction coefficient that allows for such deformation of the projection image that cancels the distortion amount dp.

The memory 47 stores, for example, programs and data to be handled at the controller 40.

[Operation]

The operation of the projection display 1 according to the embodiment is described with reference to FIGS. 1 to 10. FIG. 4 is a schematic diagram that illustrates the amount of distortion of a projection image caused by the unevenness of the projection surface A. FIGS. 5A and 5B are perspective diagrams that illustrate the structure of a wall surface. FIG. 6 is a flow chart of image correction. FIG. 7 is a schematic view of an example pattern image. FIG. 8 is a schematic diagram that illustrates captured images of the pattern image and the linear light. FIG. 9 is a schematic diagram that illustrates setting operation of a reference line and calculation operation of a differential value. FIG. 10 is a schematic diagram that illustrates parameters for operational processing used upon estimation of the distortion amount of the projection image. It is to be noted that the description of an "image correction method" of the disclosure is omitted because the method is embodied by the operations of the projection display 1 described below.

When a picture (image) based on the picture signals Dt0 (or picture signals Dt2 described later) is displayed on the image display device 42 with the projection display 1 being disposed in front of the projection surface A (disposed on the mounting surface B), the picture (projection light L1) is projected onto the projection surface A through the projection unit 10. This makes it possible to project the picture to the projection surface A.

However, it is difficult to secure the flatness of the projection surface A in a case where the projection surface A is a wall surface, for example, as schematically illustrated in FIG. 4. On the assumption that the projection surface A is a wall surface of a common residence, for example, the wall surface is likely to have asperities primarily along a predetermined direction (for example, horizontal direction, X-direction), whereas very unlikely along another direction (for example, vertical direction, Y-direction). This is because the asperities of the wall surface are caused by, for example, a dimensional error or misalignment upon construction of a structural material to which a plaster board functioning as a wallpaper backing or a coating surface is fixed, as illustrated in FIGS. 5A and 5B. As described above, it may be presumed that the projection surface A, which is a wall surface, for example, basically has asperities only in a predetermined direction. In other words, the projection surface A has significant asperities that may influence the projection image along a predetermined direction (X-direction, in this embodiment).

On the assumption that the projection surface A has recessed portions (defined as projection surface A'), the projection light L1 is incident on a position (p11) of the projection surface A', which is located above (on the positive side of the Y-direction) the upper end position p1 of the projection surface A, in accordance with the amount of displacement of the asperities (recesses) (displacement amount da between the projection surfaces A and A'). As a result, a corrugated distortion is visually observed on the projection image due to the asperities of the projection surface A, when the projection surface A (projection surface A') is observed by a user from the front (viewing from an observing direction Dz). The distortion that occurs on the projection image becomes large as approaching the upper end position p1 within the projection range B1.

Accordingly, correction of the distortion is performed on the projection image in the embodiment. FIG. 6 is a flow chart of image correction processing according to the embodiment.

Specifically, the imaging signal processor 43 corrects the distortion of the projection image on the basis of the image resulting from the imaging of the linear light L2a. In this embodiment, the light irradiator 30 is disposed more adjacent to the projection surface A than the exit opening 10B of the projection unit 10, as described above. In other words, the light irradiator 30 irradiates the projection surface A with the linear light L2a (laser light L2) at a shallower incident angle than that of the projection light L1 (a1'>a2'). This allows the laser light L2 outputted to the upper end position p1 of the projection surface A to be incident on the position p12 on the projection surface A' further above the incident position p11 at which the projection light L1 is incident. Accordingly, the distortion amount dr (first distortion amount) of the linear light L2a becomes greater than the distortion amount dp (second distortion amount) of the projection image (dr>dp). The distance between the position p1 and the position p12 along the Y-direction of the linear light L2a corresponds to the distortion amount dr, and the distance between the position p1 and the position p11 along the Y-direction of the projection light L1 corresponds to the distortion amount dp.

Furthermore, since the light irradiator 30 is disposed on an optical axis different from that of the camera of the imaging unit 20, the image of the linear light L2a captured with the imaging unit 20 is distorted. In the embodiment, the distortion of the projection image is estimated and corrected on the basis of the distortion of the linear light L2a.

In detail, first, the projection unit 10 projects a pattern image 120 to the projection surface A, and the light irradiator 30 emits the linear light L2a to the upper end position p1 (Step S11 illustrated in FIG. 6). An example of the pattern image 120 is illustrated in FIG. 7. The pattern image 120 has, for example, lines or dots that are regularly aligned, and is a grid (lattice) pattern in this embodiment, for example. The pattern image 120 defines coordinates used upon calculation of the distortion amount of the linear light L2a described later. For example, the vertical lines of the pattern image 120 define the horizontal coordinates (X-coordinates) of sampling points used upon calculation of the distortion amount. In addition, an interval between lines of the pattern image 120 in the horizontal direction (X-direction) corresponds to a sampling interval used upon the distortion detection. A shorter interval in the horizontal direction is desirable in that the accuracy in the correction improves.

Next, the mounting position of the projection display 1 is finely adjusted on the basis of the shapes, positions, etc., of the pattern image 120 and the linear light L2a that are displayed on the projection surface A (Step S12). Specifically, the mounting position is finely adjusted as appropriate such that the horizontal lines of the pattern image 120 on the projection surface A and the linear light L2a become substantially parallel to each other. It is to be noted that the fine adjustment is manually performed by a user, for example. Alternatively, the projection display 1 may be provided with an adjustment function, and the fine adjustment may be performed by the adjustment function.

Subsequently, the imaging unit 20 performs imaging of individual images of the pattern image 120 and the linear light L2a that are displayed on the projection surface A (Step S13). Specifically, first, the projection unit 10 projects the pattern image 120 to the projection surface A, and the imaging unit 20 captures an image of the projection surface A in a state in which the light irradiator 30 does not emit the linear light L2a. Thereafter, the light irradiator 30 emits the linear light L2a to, for example, the upper end position p1 of the projection surface A, and the imaging unit 20 captures an image of the projection surface A in a state in which the projection unit 10 does not project the pattern image 120. The order of the image capturing of the pattern image 120 and the linear light L2a may be reversed. Alternatively, the images of the pattern image 120 and the linear light L2a may be captured simultaneously in accordance with contents of the operational processing described later.

FIG. 8 schematically illustrates the captured image of the pattern image 120 (captured image 120A) and the captured image of the linear light L2a (captured image L2a1). As illustrated in FIG. 8, corrugated distortions due to the asperities of the projection surface A are generated in both the captured image L2a1 of the linear light L2a and the captured image 120A of the pattern image 120. Further, the distortion amount of the captured image 120A of the pattern image 120 in the Y-direction (the distortion amount corresponding to the distortion amount dp) is maximum at the upper end position p1, and becomes small as approaching the lower end position p2. The distortion amount of the captured image L2a1 of the linear light L2a in the Y-direction (the distortion amount corresponding to the distortion amount dr) is greater than the distortion amount of the captured image 120A at the upper end position p1. An imaging signal DO that include the captured image L2a1 of the linear light L2a and the captured image 120A of the pattern image 120 are outputted to the imaging signal processor 43.

Thereafter, the imaging signal processor 43 performs processes, i.e., lens distortion correction and projective transformation, into a front-view image, on each of the captured image L2a1 of the linear light L2a and the captured image 120A of the pattern image 120 (Step S14). These processes are performed on each of the captured image L2a1 of the linear light L2a and the captured image 120A of the pattern image 120 by the distortion detector 44, for example. This allows the distortion of the linear light L2a to be detected with accuracy.

Next, the distortion detector 44 performs thinning on the captured images L2a1 and 120A having been subjected to the processes in Step S14 described above (Step S15). In Step S15, each of the captured images L2a1 and 120A is thinned into approximately one-pixel width, for example. The thinning of the captured images L2a1 and 120A may be performed after binarization of the images, or may be performed through calculation of the median of a gray-scale distribution, for example. Such thinning allows the distortion of the linear light L2a to be detected with accuracy.

Subsequently, the distortion detector 44 sets a reference line on the basis of the captured image L2a1 of the linear light L2a (Step S16). The reference line may be calculated through linear fitting of the captured image L2a1, for example. FIG. 9 illustrates an example of the reference line. As illustrated in FIG. 9, the reference line 130 in a linear form, for example, is set for the captured image L2a1 of the linear light L2a.

Next, the distortion detector 44 calculates the distortion amount dr of the captured image L2a1 of the linear light L2a on the basis of the captured image L2a1 of the linear light L2a and the captured image 120A of the pattern image 120 (Step S17). Specifically, a differential value between the captured image L2a1 of the linear light L2a and the reference line 130 at a selective point on the captured image 120A of the pattern image 120 is calculated. For example, as illustrated in FIG. 9, a differential value S(x) between the captured image L2a1 and the reference line 130 in the vertical direction (Y-direction) is calculated, where the vertical lines of the captured image 120A of the pattern image 120 are defined as the sampling points corresponding to the horizontal coordinates (X-coordinates) ( . . . , x−1, x, x+1, . . . where x is integral). It is possible to calculate the distortion amount dr (in detail, the distortion amount dr(x)) from the differential value S(x). The signal Dt11 indicating the distortion amount dr is outputted to the distortion estimator 45.

Next, the distortion estimator 45 estimates a distortion amount dp of the projection image on the basis of the inputted signal Dt11 (Step S18). As described above, the projection surface A is likely to have asperities primarily in one direction (horizontal direction (X-direction) in this embodiment), whereas very unlikely in the vertical direction (Y-direction) orthogonal to the horizontal direction. Accordingly, it can be presumed that the displacement amount da at a horizontal coordinate x due to the asperities of the projection surface A is constant from the upper end position p1 to the lower end position p2 in the projection range B1. The distortion amount dp thus can be estimated through operational processing using the following expressions (1) to (3):

$$da = dr/\tan(a2) \quad (1)$$

$$dp = da \cdot \tan(a1) \quad (2)$$

$$dp = [\tan(a1)/\tan(a2)] \cdot dr \quad (3)$$

where dr represents the distortion amount of the linear light L2a (laser light L2), dp represents the distortion amount of the projection image (projection light L1), a1 represents the elevation angle (emission angle of the projection light L1) of the projection light L1, and a2 represents the elevation angle (emission angle of the laser light L2) of the laser light L2 (refer to FIG. 10).

Here, these elevation angles a1 and a2 have values determined on the basis of the design specifications or measurement of the projection display 1. Accordingly, detecting the distortion amount dr of the linear light L2a makes it possible to calculate the displacement amount da of the projection surface A and the distortion amount dp of the projection image through the operational processing. It is to be noted that, strictly speaking, the displacement amount da slightly varies with increase in distance from the incident position of the linear light L2a (upper end position p1, in this embodiment), and thus the estimated distortion amount dp may possibly have an error. However, an influence of the error becomes small with decrease in the elevation angle a1 and the distortion amount dp toward a lower portion (as approaching the lower end position p2) of the projection range B1. A signal Dt12 indicating the distortion amount dp estimated as described above is outputted to the correction coefficient calculator 46.

Next, the correction coefficient calculator 46 calculates a correction coefficient on the basis of the inputted signal Dt12 (Step S19). Specifically, a correction coefficient that allows for such deformation of the projection image that cancels the distortion amount dp is calculated on the basis of the distortion amount dp of the projection image. Since the elevation angle a1 gradually becomes large from the lower end position p2 toward the upper end position p1 in the projection range B1, the distortion amount dp gradually becomes large from the lower end position p2 toward the upper end position p1, as defined by the expression (2) described above. Accordingly, the correction coefficient calculator 46 makes it possible to set a correction coefficient in view of such variation in the distortion amount dp and correct the distortion of the projection image. Alternatively, since the distortion amount dp is maximum at the upper end position p1 in the projection range B1 as described above, the correction coefficient may be set so that only a portion of the projection range B1 (for example, a region around the upper end position p1 susceptible to the distortion) is subjected to the distortion correction. The calculated correction coefficient (correction coefficient signal Dt13) is stored in the memory 47, for example. Alternatively, the correction coefficient signal Dt13 may be directly inputted to the picture signal processor 41.

Subsequently, the picture signal processor (correction unit) 41 performs geometry correction process on the projection image (picture signals Dt0) using the correction coefficient signal Dt13 stored in the memory 47 (Step S20). The data on the corrected projection image (picture signals Dt2) is sent to the image display device 42 at a predetermined timing on the basis of the control of the controller 40. This makes it possible to project, to the projection surface A, the picture having been subjected to the correction of the distortion caused by the unevenness of the projection surface A.

It is to be noted that the sequential processing operations (the detection operation of the distortion amount dr, the estimation operation of the distortion amount dp, the calculation operation of the correction coefficient, and the correction operation of the image) performed by the imaging signal processor 43 and the picture signal processor 41 may be performed by an electronic circuitry mounted in the projection display 1, as described above, or may be performed by software in the controller 40 or an external device, for example. Further, the imaging signal processor 43 and the picture signal processor 41 (signal processor) include one or more electronic circuit devices (such as CPUs or GPUs). For example, the processing operations (the detection operation of the distortion amount dr, the estimation operation of the distortion amount dp, and the calculation operation of the correction coefficient) performed by the imaging signal processor 43 may be performed by a single electronic circuit device or may be performed by separate electronic circuit devices.

In the following, an example of the foregoing image correction processing is described. FIGS. 11A and 12 represent numerical examples of parameters. In addition, FIG. 11B illustrates a region around the upper end position p1 illustrated in FIG. 11A with enlargement. In the numerical examples, the projection display 1 has a size of a projection range B1 of 150 inches, an elevation angle (elevation angle of the optical axis of the imaging unit 20) of the imaging unit 20 (camera) of 57.2°, a diagonal angle of view of 76.7°, and the number of pixels of 20.7 megapixels. A viewing angle of the imaging unit 20 with respect to the upper end position p1 is 72.39°, and a viewing angle of the imaging unit 20 with respect to the upper end position p11 is 72.40°. In addition, the elevation angle a1 of the projection light L1 incident on the upper end position p1 is 74.8°, and the elevation angle a2 of the laser light L2 incident on the upper end position p1 is 82.4°. The distortion amount dr of the linear light L2a is 22.5 mm, and the distortion amount dp of the projection image (pattern image 120) is 11.0 mm. In addition, the displacement amount da of the projection surface A is 3 mm.

First, in such a configuration, a case is described where the distortion amount of the projection image is to be detected directly from a captured image of the projection image as illustrated by way of example in FIG. 11A. In this case, a large distortion amount dp of 11.0 mm is generated in a front view (from the user's viewing direction), whereas a distortion amount dc1 observed from the mounting position of the imaging unit 20 is 0.5 mm. The size of 0.5 mm corresponds to approximately one pixel of a camera, for example, which makes it difficult to detect the distortion amounts dc1 and dp of the projection image directly from the captured image of the projection image.

In this regard, a case is described where the distortion amount is to be detected on the basis of the captured image of the linear light L2a in the embodiment. In this case, as illustrated in FIG. 12, the distortion amount dr is 22.5 mm in a front view, whereas the distortion amount dc2 observed from the mounting position of the imaging unit 20 is 4.1 mm. The size of 4.1 mm corresponds to approximately eight pixels of a camera, for example, which makes it possible to detect the distortion amounts dc2 and dr from the captured image with sufficient accuracy. It is possible to estimate the distortion amount dp of the projection image through the operational processing as described above, which makes it easier to convert the distortion amount dr of the linear light L2a into the distortion amount dp of the projection image. Accordingly, estimating the distortion amount dp of the projection image on the basis of the distortion amount dr of the linear light L2a makes it possible to enhance the detection sensitivity to the distortion amount dp and improve the correction accuracy.

Accordingly, in the projection display 1 according to the embodiment, the light irradiator 30 irradiates the projection surface A with the predetermined linear light L2a at a shallower incident angle (a2') than the incident angle (a1') of the projection light L1, and the imaging unit 20 having an optical axis different from that of the light irradiator 30 captures an image of the linear light L2a, as described above. The imaging signal processor 43 and the picture signal processor 41 correct the distortion of the projection image on the basis of the captured image of the linear light L2a. This makes it possible to correct the image distortion caused by the unevenness of the projection surface A without the necessity of placing a camera and capturing with the camera by a user. Accordingly, it is possible to improve the quality of the projection image while maintaining convenience.

Next, a modification of the above-mentioned embodiment is described. The components similar to those in the above-mentioned embodiment are assigned with the same reference numerals and the description thereof is omitted as appropriate.

[Modification]

FIG. 13 is a schematic view of a schematic configuration of a projection display according to a modification and illustrates use state of the projection display. Although a case has been described in which the light irradiator 30 emits linear light L2a to the upper end position p1 of the projection range B1 in the above-mentioned embodiment, the light irradiator 30 may be able to emit the linear light L2a to a plurality of positions within the projection range B1 in the modification.

The light irradiator 30 according to the modification emits laser light L2 at a variable elevation angle (emission angle) a2, for example. For example, the light irradiator 30 is able to emit pieces of laser light L21, L22, and L23 at elevation angles a21, a22, and a23, respectively. For example, the laser light L21 is emitted to an uppermost position p3 at the elevation angle a21, the laser light L22 is emitted to a position p4 below the position p3 at the elevation angle a22, and the laser light L23 is emitted to a position p5 below the position p4 at the elevation angle a23. This divides the projection range B1 into a number of regions that are each irradiated with the corresponding linear light L2a. It is possible to change the elevation angle a2 of the laser light L2 using a stepping motor, for example, so that the linear light L2a is sequentially emitted to the positions p3, p4, and p5.

Alternatively, the light irradiator 30 may include a plurality of laser light sources that emit pieces of laser light that are different from each other in elevation angle. For example, the light irradiator 30 may include a first laser light source emitting the laser light L21 to the position p3 at the elevation angle a21, a second laser light source emitting the laser light L22 to the position p4 at the elevation angle a22, and a third laser light source emitting the laser light L23 to the position p5 at the elevation angle a23. In this case, the linear light L2a may be sequentially or simultaneously emitted to the positions p3, p4, and p5.

It is to be noted that the light irradiator 30 is disposed more adjacent to the projection surface A than the exit opening 10B of the projection unit 10 and has an optical axis different from that of the imaging unit 20, as in the above-mentioned embodiment. This means that the linear light L2a formed of the laser light L21 is incident on the projection surface A at a shallower incident angle than that of the projection light L11 emitted to the position p3 at the elevation angle a11. The linear light L2a formed of the laser light L22 is incident on the projection surface A at a shallower incident angle than that of the projection light L12 emitted to the position p4 at the elevation angle a12. The linear light L2a formed of the laser light L23 is incident on the projection surface A at a shallower incident angle than that of the projection light L13 emitted to the position p5 at the elevation angle a13.

In the projection display including such a light irradiator 30, the imaging signal processor 43 and the picture signal processor 41 correct the distortion of the projection image on the basis of the captured images of the linear light L2a emitted to the plurality of positions, for each of regions corresponding to the respective positions at which the linear light L2a is emitted.

In the modification, the projection range B1 is virtually divided into three regions E1, E2, and E3 along the Y-direction (vertical direction). The divided regions E1, E2, and E3 are sequentially irradiated with the linear light L2a, and an image of the projection surface A is captured upon each irradiation. The sequential signal processing operations (the detection of the distortion amount dr, the estimation of the distortion amount dp, the calculation of the correction coefficient, and the correction of the image) described in the above-mentioned embodiment are then performed on the basis of the captured images of the respective regions E1, E2, and E3.

Specifically, an image of the linear light L2a incident on the position p3 in the region E1 is captured to detect a distortion amount dr1 of the linear light L2a. The distortion amount dr1 corresponds to the distance between the position p3 on the projection surface A and a position p31 on the projection surface A' (incident position of the laser light L21 on the projection surface A') along the Y-direction. Similarly, an image of the linear light L2a incident on the position p4 in the region E2 is captured to detect a distortion amount dr2 of the linear light L2a. The distortion amount dr2 corresponds to the distance between the position p4 on the projection surface A and a position p41 on the projection surface A' (incident position of the laser light L22 on the projection surface A') along the Y-direction. An image of the linear light L2a incident on the position p5 in the region E3 is captured to detect a distortion amount dr3 of the linear light L2a. The distortion amount dr3 corresponds to the distance between the position p5 on the projection surface A and a position p51 on the projection surface A' (incident position of the laser light L23 on the projection surface A') along the Y-direction. Although the linear light L2a is emitted to three positions to divide the projection range B1 into three regions in the modification, the number of divided regions (the number of incident positions of the linear light L2a) is not limited to three and may be two or four or more.

Distortion amounts dp1, dp2, and dp3 of the projection image are estimated respectively on the basis of the detected distortion amounts dr1, dr2, and dr3 of the regions E1, E2, and E3. The distortion amount dp1 corresponds to the distance between the position p3 on the projection surface A and a position p32 on the projection surface A' (incident position of the projection light L11 on the projection surface A') along the Y-direction. The distortion amount dp2 corresponds to the distance between the position p4 on the projection surface A and a position p42 on the projection surface A' (incident position of the projection light L12 on the projection surface A') along the Y-direction. The distortion amount dp3 corresponds to the distance between the position p5 on the projection surface A and a position p52 on the projection surface A' (incident position of the projection light L13 on the projection surface A') along the Y-direction.

In a case where the projection range B1 is divided into n regions (n is an integral number of 2 or greater), it is possible to calculate a distortion amount dp(n) of the projection image in each region En through operational processing using the following expressions (4) to (6):

$$da(n)=dr(n)/\tan(a2n) \quad (4)$$

$$dp(n)=da(n)\cdot\tan(a1n) \quad (5)$$

$$dp(n)=[\tan(a1n)/\tan(a2n)]\cdot dr(n) \quad (6)$$

where da(n) represents the displacement amount of the projection surface A in the region E(n), dr(n) represents the distortion amount of the linear light L2a in the region E(n), dp(n) represents the distortion amount of the projection image in the region E(n), a1n represents the elevation angle of the projection light L1n in the region E(n), and a2n represents the elevation angle of the laser light L2n in the region E(n).

The elevation angles a1n and a2n are values determined on the basis of the design specifications or measurement of the projection display 1, as in the above-mentioned embodiment. Accordingly, detecting the distortion amount dr(n) of linear light L2a in each region makes it possible to calculate the displacement amount da(n) of the projection surface A and the distortion amount dp(n) of the projection image through the operational processing.

A correction coefficient is calculated for each region E(n) on the basis of the distortion amount dp(n) of each region E(n) of the projection image that is calculated as described above, and the correction of the distortion is performed. Accordingly, it is possible also in the modification to correct the distortion of the projection image caused by the unevenness of the projection surface A without the necessity of placing a camera and capturing with the camera by a user, as in the above-mentioned embodiment. This makes it possible to improve the quality of the projection image while maintaining the convenience.

Furthermore, the modification enables the image correction for each region divided along the Y-direction (vertical direction). Thus, it is effective particularly for a case where the projection surface A has the displacement amount da that varies in the vertical direction. In other words, it is possible to enhance the estimation accuracy of the distortion amount of the projection image and improve the correction accuracy of the distortion (it is possible to perform extremely fine distortion correction).

Although the description has been made by referring to the embodiment and its modification as mentioned above, the disclosure is not limited to the above-mentioned embodiment and modification and may be modified in a variety of ways. For example, although a case has been described where the light irradiator 30 emits the linear light L2a extending along the horizontal direction (X-direction) in the above-mentioned embodiment, the extending direction of the linear light is not limited to the horizontal direction in the disclosure. The projection display of the disclosure makes it possible to correct the distortion in a direction orthogonal to the extending direction of the linear light, and the linear light may extend in different directions depending on the intended use. For example, although the above-mentioned embodiment and modification are based on the assumption that the projection surface A is a wall surface, the projection surface A is not limited to the wall surface. For example, it is possible to assume any of various locations having unevenness as the projection surface A, besides the wall surface. The extending direction of the linear light may be set depending on the unevenness of such a projection surface A. Alternatively, the light irradiator may have a mechanism that turns the extending direction of the linear light within the projection surface.

It is also to be noted that effects described in the above embodiment and modification are merely exemplified. Effects of the disclosure may be any other effects or may further include any other effects.

Moreover, the disclosure may have the following configurations.

(1)

A projection display including:

an image display device that displays an image;

a projection unit that projects the image displayed by the image display device to a projection surface;

a light irradiator that irradiates the projection surface with linear light at an incident angle shallower than an incident angle of projection light, the linear light extending along a first direction within the projection surface;

an imaging unit that has an optical axis different from an optical axis of the light irradiator, and performs capturing of the projection surface; and a signal processor that performs signal processing on an imaging signal outputted from the imaging unit, the imaging unit performing capturing of the linear light with which the projection surface is irradiated, and the signal processor correcting, on a basis of a captured image of the linear light, a distortion of the projected image.

(2)

The projection display according to (1), in which the signal processor includes:

a detector that detects, on the basis of the captured image of the linear light, a first distortion amount of the linear light;

an estimator that estimates, on a basis of the detected first distortion amount, a second distortion amount of the image;

a correction coefficient calculator that calculates, on a basis of the estimated second distortion amount, a correction coefficient; and a correction unit that corrects the image using the correction coefficient.

(3)

The projection display according to (2), in which the light irradiator irradiates the projection surface with the linear light, the projection unit projects a pattern image to the projection surface, the pattern image having lines or dots that are regularly aligned, and the detector sets, on a basis of the captured image of the linear light, a reference line, calculates, on a basis of the captured image of the linear light and a captured image of the pattern image, a differential value between the linear light and the reference line at a selective point on the pattern image, and calculates the first distortion amount from the differential value.

(4)

The projection display according to (2) or (3), in which the estimator estimates the second distortion amount through operational processing that uses the following expressions [1] to [3]:

$$da = dr/\tan(a2) \quad [1]$$

$$dp = da \cdot \tan(a1) \quad [2]$$

$$dp = [\tan(a1)/\tan(a2)] \cdot dr \quad [3]$$

where da is a displacement amount resulting from asperities of the projection surface, dr is a distortion amount (the first distortion amount) of the linear light, dp is a distortion amount (the second distortion amount) of the image, a1 is an emission angle of the projection light, and a2 is an emission angle of the linear light.

(5)

The projection display according to (3), in which the detector performs thinning on each of the captured image of the linear light and the captured image of the pattern image.

(6)

The projection display according to any one of (2) to (5), in which the detector detects a distortion amount in a second direction orthogonal to the first direction of the linear light.

(7)

The projection display according to (6), in which the first direction includes a horizontal direction, and the second direction includes a vertical direction.

(8)

The projection display according to any one of (1) to (7), in which the light irradiator emits the linear light to an upper end position in a projection range of the projection surface.

(9)

The projection display according to (8), in which the signal processor corrects, on a basis of the captured image of the linear light emitted to the upper end position, the distortion of a portion or an entire region of the image.

(10)

The projection display according to any one of (1) to (9), in which the light irradiator is able to emit the linear light to a plurality of positions in a projection range of the projection surface.

(11)

The projection display according to (10), in which the signal processor corrects, on a basis of the captured image of the linear light emitted to each of the plurality of positions, the distortion of the image, for each of regions that correspond to the respective positions at which the linear light is emitted.

(12)

The projection display according to any one of (1) to (11), in which the light irradiator includes a laser light source.

(13)

The projection display according to (12), in which the projection display has a function of detecting an object that approaches the light irradiator, and stops emission of the linear light by the light irradiator in a case where the object is detected.

(14)

The projection display according to any one of (1) to (13), in which the projection unit includes a short focus lens.

(15)

An image correction method including, upon correcting an image projected to a projection surface:

irradiating the projection surface with linear light at an incident angle shallower than an incident angle of projection light, the linear light extending along a first direction within the projection surface;

performing capturing, from an optical path different from an optical path of the linear light, the linear light with which the projection surface is irradiated; and correcting, on a basis of a captured image of the linear light, a distortion of the projected image.

(16)

The image correction method according to (15), in which a first distortion amount of the linear light is detected on the basis of the captured image of the linear light, a second distortion amount of the image is estimated on a basis of the detected first distortion amount, and the image is corrected on a basis of the estimated second distortion amount.

(17)

The image correction method according to (16), in which the projection surface is irradiated with the linear light and a pattern image is projected to the projection surface, the pattern image having lines or dots that are regularly aligned, a reference line is set on a basis of the captured image of the linear light, and a differential value between the linear light and the reference line at a selective point on the pattern image is calculated on a basis of the captured image of the linear light and a captured image of the pattern image, and the first distortion amount is calculated from the differential value.

(18)

The image correction method according to (16) or (17), in which the second distortion amount is estimated through operational processing that uses the following expressions [1] to [3]:

$$da = dr/\tan(a2) \quad [1]$$

$$dp = da \cdot \tan(a1) \quad [2]$$

$$dp = [\tan(a1)/\tan(a2)] \cdot dr \quad [3]$$

where da is a displacement amount resulting from asperities of the projection surface, dr is a distortion amount (the first distortion amount) of the linear light, dp is a distortion amount (the second distortion amount) of the projected image, a1 is an emission angle of the projection light, and a2 is an emission angle of the linear light.

(19)

The image correction method according to any one of (15) to (18), in which the linear light is emitted to an upper end position in a projection range of the projection surface, and the distortion of a portion or an entire region of the image is corrected on a basis of the captured image of the linear light emitted to the upper end position.

(20)

The image correction method according to any one of (15) to (18), in which the linear light is sequentially or simultaneously emitted to a plurality of positions in a projection range of the projection surface, and the distortion of the image is corrected on a basis of the captured image of the linear light emitted to each of the plurality of positions, for each of regions that correspond to the respective positions at which the linear light is emitted.

This application claims the benefit of Japanese Priority Patent Application JP2015-198762 filed with the Japan Patent Office on Oct. 6, 2015, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A projection display comprising:
an image display device that displays an image;
a projection unit that projects the image displayed by the image display device to a projection surface;
a light irradiator that irradiates the projection surface with linear light at an incident angle shallower than an incident angle of projection light, the linear light extending along a first direction within the projection surface;
an imaging unit that has an optical axis different from an optical axis of the light irradiator, and performs capturing of the projection surface; and
a signal processor that performs signal processing on an imaging signal outputted from the imaging unit,
the imaging unit performing capturing of the linear light with which the projection surface is irradiated, and
the signal processor correcting, on a basis of a captured image of the linear light, a distortion of the projected image.

2. The projection display according to claim 1, wherein the signal processor includes:
a detector that detects, on the basis of the captured image of the linear light, a first distortion amount of the linear light;
an estimator that estimates, on a basis of the detected first distortion amount, a second distortion amount of the image;
a correction coefficient calculator that calculates, on a basis of the estimated second distortion amount, a correction coefficient; and
a correction unit that corrects the image using the correction coefficient.

3. The projection display according to claim 2, wherein the light irradiator irradiates the projection surface with the linear light,
the projection unit projects a pattern image to the projection surface, the pattern image having lines or dots that are regularly aligned, and
the detector
sets, on a basis of the captured image of the linear light, a reference line,
calculates, on a basis of the captured image of the linear light and a captured image of the pattern image, a differential value between the linear light and the reference line at a selective point on the pattern image, and calculates the first distortion amount from the differential value.

4. The projection display according to claim 3, wherein the detector performs thinning on each of the captured image of the linear light and the captured image of the pattern image.

5. The projection display according to claim 2, wherein the estimator estimates the second distortion amount through operational processing that uses the following expressions (1) to (3):

$$da = dr/\tan(a2) \quad (1)$$

$$dp = da \cdot \tan(a1) \quad (2)$$

$$dp = [\tan(a1)/\tan(a2)] \cdot dr \quad (3)$$

where
da is a displacement amount resulting from asperities of the projection surface,
dr is a distortion amount (the first distortion amount) of the linear light,
dp is a distortion amount (the second distortion amount) of the image,
a1 is an emission angle of the projection light, and
a2 is an emission angle of the linear light.

6. The projection display according to claim 2, wherein the detector detects a distortion amount in a second direction orthogonal to the first direction of the linear light.

7. The projection display according to claim 6, wherein the first direction comprises a horizontal direction, and the second direction comprises a vertical direction.

8. The projection display according to claim 1, wherein the light irradiator emits the linear light to an upper end position in a projection range of the projection surface.

9. The projection display according to claim 8, wherein the signal processor corrects, on a basis of the captured image of the linear light emitted to the upper end position, the distortion of a portion or an entire region of the image.

10. The projection display according to claim 1, wherein the light irradiator is able to emit the linear light to a plurality of positions in a projection range of the projection surface.

11. The projection display according to claim 10, wherein the signal processor corrects, on a basis of the captured image of the linear light emitted to each of the plurality of positions, the distortion of the image, for each of regions that correspond to the respective positions at which the linear light is emitted.

12. The projection display according to claim 1, wherein the light irradiator includes a laser light source.

13. The projection display according to claim 12, wherein the projection display
has a function of detecting an object that approaches the light irradiator, and
stops emission of the linear light by the light irradiator in a case where the object is detected.

14. The projection display according to claim 1, wherein the projection unit includes a short focus lens.

15. An image correction method comprising, upon correcting an image projected to a projection surface:

irradiating the projection surface with linear light at an incident angle shallower than an incident angle of projection light, the linear light extending along a first direction within the projection surface;

performing capturing, from an optical path different from an optical path of the linear light, the linear light with which the projection surface is irradiated; and correcting, on a basis of a captured image of the linear light, a distortion of the projected image.

16. The image correction method according to claim 15, wherein
a first distortion amount of the linear light is detected on the basis of the captured image of the linear light,
a second distortion amount of the image is estimated on a basis of the detected first distortion amount, and
the image is corrected on a basis of the estimated second distortion amount.

17. The image correction method according to claim 16, wherein
the projection surface is irradiated with the linear light and a pattern image is projected to the projection surface, the pattern image having lines or dots that are regularly aligned,
a reference line is set on a basis of the captured image of the linear light, and
a differential value between the linear light and the reference line at a selective point on the pattern image is calculated on a basis of the captured image of the linear light and a captured image of the pattern image, and the first distortion amount is calculated from the differential value.

18. The image correction method according to claim 16, wherein the second distortion amount is estimated through operational processing that uses the following expressions (1) to (3):

$$da = dr/\tan(a2) \qquad (1)$$

$$dp = da \cdot \tan(a1) \qquad (2)$$

$$dp = [\tan(a1)/\tan(a2)] \cdot dr \qquad (3)$$

where
da is a displacement amount resulting from asperities of the projection surface,
dr is a distortion amount (the first distortion amount) of the linear light,
dp is a distortion amount (the second distortion amount) of the projected image,
a1 is an emission angle of the projection light, and
a2 is an emission angle of the linear light.

19. The image correction method according to claim 15, wherein
the linear light is emitted to an upper end position in a projection range of the projection surface, and
the distortion of a portion or an entire region of the image is corrected on a basis of the captured image of the linear light emitted to the upper end position.

20. The image correction method according to claim 15, wherein
the linear light is sequentially or simultaneously emitted to a plurality of positions in a projection range of the projection surface, and
the distortion of the image is corrected on a basis of the captured image of the linear light emitted to each of the plurality of positions, for each of regions that correspond to the respective positions at which the linear light is emitted.

* * * * *